(12) United States Patent
Brack

(10) Patent No.: US 11,786,337 B2
(45) Date of Patent: Oct. 17, 2023

(54) HEAD BEARING ASSEMBLY FOR A DENTAL OR SURGICAL HANDPIECE AND DENTAL OR SURGICAL HANDPIECE COMPRISING SUCH A HEAD BEARING ASSEMBLY

(71) Applicant: MINEBEA MITSUMI INC., Nagano (JP)

(72) Inventor: Stefan Brack, Leutkirch (DE)

(73) Assignee: MINEBEA MITSUMI INC., Nagano (JP)

( * ) Notice: Subject to any disclaimer, the term of this patent is extended or adjusted under 35 U.S.C. 154(b) by 0 days.

(21) Appl. No.: 17/727,320

(22) Filed: Apr. 22, 2022

(65) Prior Publication Data
US 2022/0361980 A1     Nov. 17, 2022

(30) Foreign Application Priority Data
May 12, 2021   (DE) .......................... 102021204812.9

(51) Int. Cl.
*F16C 33/58* (2006.01)
*A61C 1/18* (2006.01)
(Continued)

(52) U.S. Cl.
CPC .............. *A61C 1/181* (2013.01); *F16C 19/18* (2013.01); *F16C 25/083* (2013.01);
(Continued)

(58) Field of Classification Search
CPC ...... F16C 19/183; F16C 19/54; F16C 19/541; F16C 19/542; F16C 19/543; F16C 19/546;
(Continued)

(56) References Cited

U.S. PATENT DOCUMENTS 3,376,084 A *  4/1968  Mckee .................... F16C 27/04
                                                          433/132
4,325,590 A    4/1982  Pethis
(Continued)

FOREIGN PATENT DOCUMENTS

CH          599782        5/1978
DE       602005004673     2/2009
(Continued)

*Primary Examiner* — Alan B Waits
(74) *Attorney, Agent, or Firm* — Faegre Drinker Biddle & Reath LLP

(57) ABSTRACT

The disclosure relates to a head bearing assembly for a dental or surgical handpiece,
  comprising an outer sleeve, in which at least four radial bearings are arranged, which enclose an axis of rotation and each have their own bearing outer ring or a common bearing outer rings, wherein
  the bearing outer rings are surrounded radially on the outside by the outer sleeve in the circumferential direction about the axis of rotation, and
  each radial bearing has at least one or exactly one rolling element row with rolling elements which are arranged one behind the other in the circumferential direction and rolling in the respective bearing outer ring.

(Continued)

The head bearing assembly according to the disclosure is characterized in that the at least four radial bearings have a common, integral bearing inner ring on which the rolling elements are arranged in rolling contact.

16 Claims, 3 Drawing Sheets

(51) Int. Cl.
  *F16C 25/08*  (2006.01)
  *F16C 19/52*  (2006.01)
  *F16C 19/18*  (2006.01)
(52) U.S. Cl.
  CPC .......... *F16C 33/583* (2013.01); *F16C 19/525* (2013.01); *F16C 19/527* (2013.01); *F16C 2316/13* (2013.01)
(58) Field of Classification Search
  CPC ...... F16C 19/547; F16C 19/548; F16C 25/06; F16C 25/08; F16C 25/0834; F16C 33/581; F16C 33/586; F16C 33/768; F16C 35/08; F16C 35/12; F16C 2316/10; F16C 2316/13; A61C 1/18; A61C 1/181; A61C 1/183
  See application file for complete search history.

(56) References Cited

U.S. PATENT DOCUMENTS

| | | | |
|---|---|---|---|
| 4,470,813 A * | 9/1984 | Thorburn | A61C 1/05 416/200 R |
| 5,692,903 A * | 12/1997 | Nakanishi | A61C 1/181 433/116 |
| 6,280,095 B1 * | 8/2001 | Furukoshi | F16C 33/768 384/489 |
| 6,655,846 B2 | 12/2003 | Beckers et al. | |
| 7,214,060 B2 | 5/2007 | Maitre | |
| 10,197,101 B2 | 2/2019 | Li et al. | |
| 2002/0097935 A1* | 7/2002 | Beckers | A61C 1/05 384/490 |
| 2003/0207233 A1* | 11/2003 | Lingenhole | A61C 1/05 433/132 |
| 2018/0021105 A1* | 1/2018 | Juillerat | A61C 1/141 433/103 |
| 2019/0170191 A1 | 6/2019 | Yamada et al. | |

FOREIGN PATENT DOCUMENTS

| | | |
|---|---|---|
| DE | 202011050062 | 7/2011 |
| FR | 3036440 | 11/2016 |

* cited by examiner

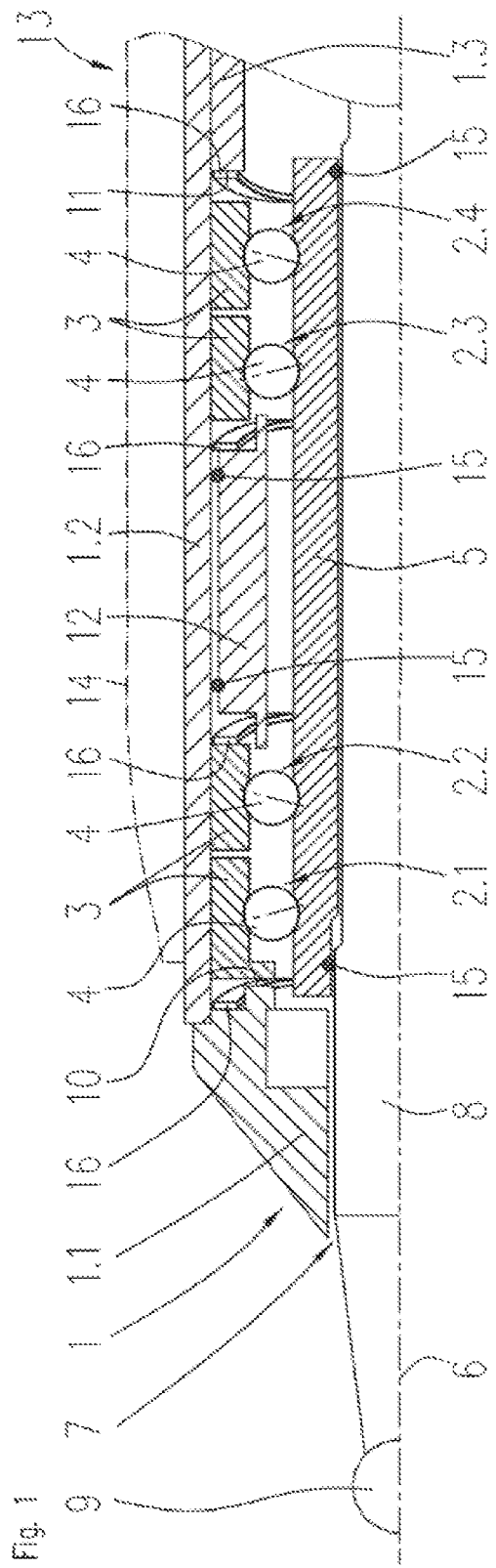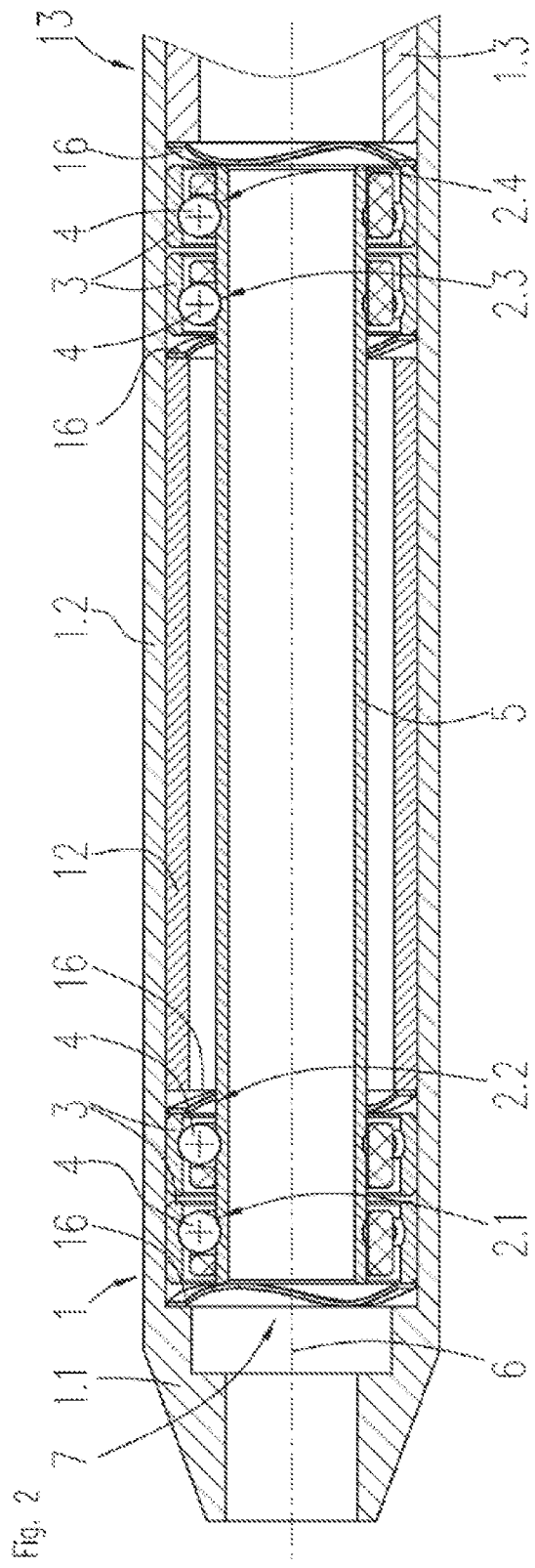

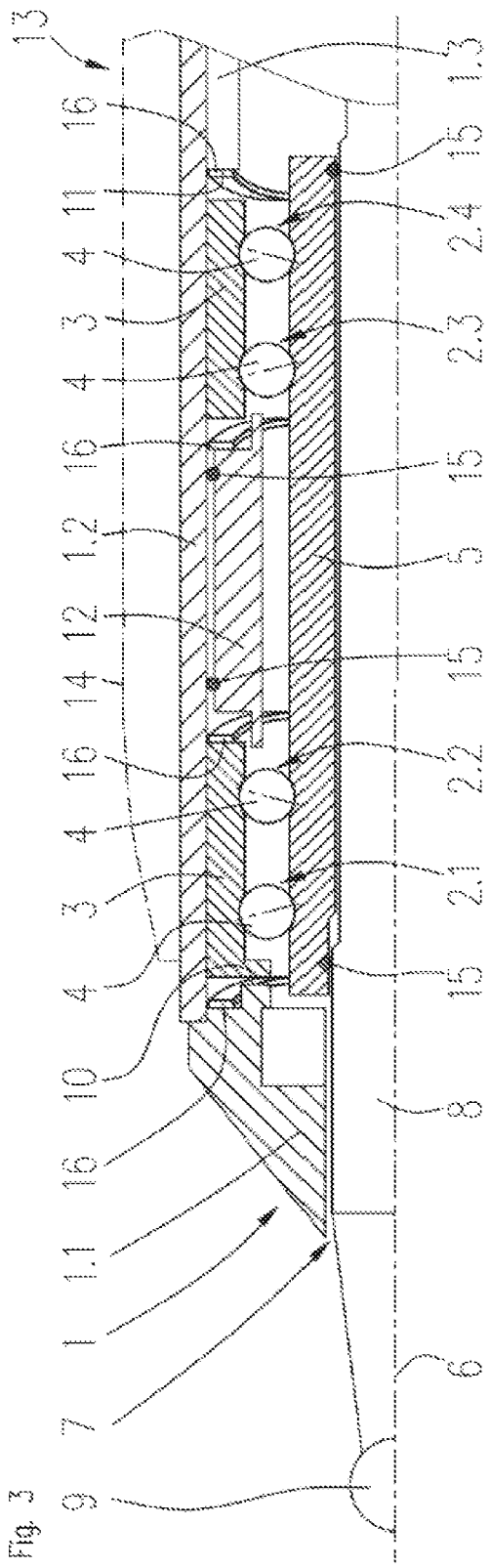
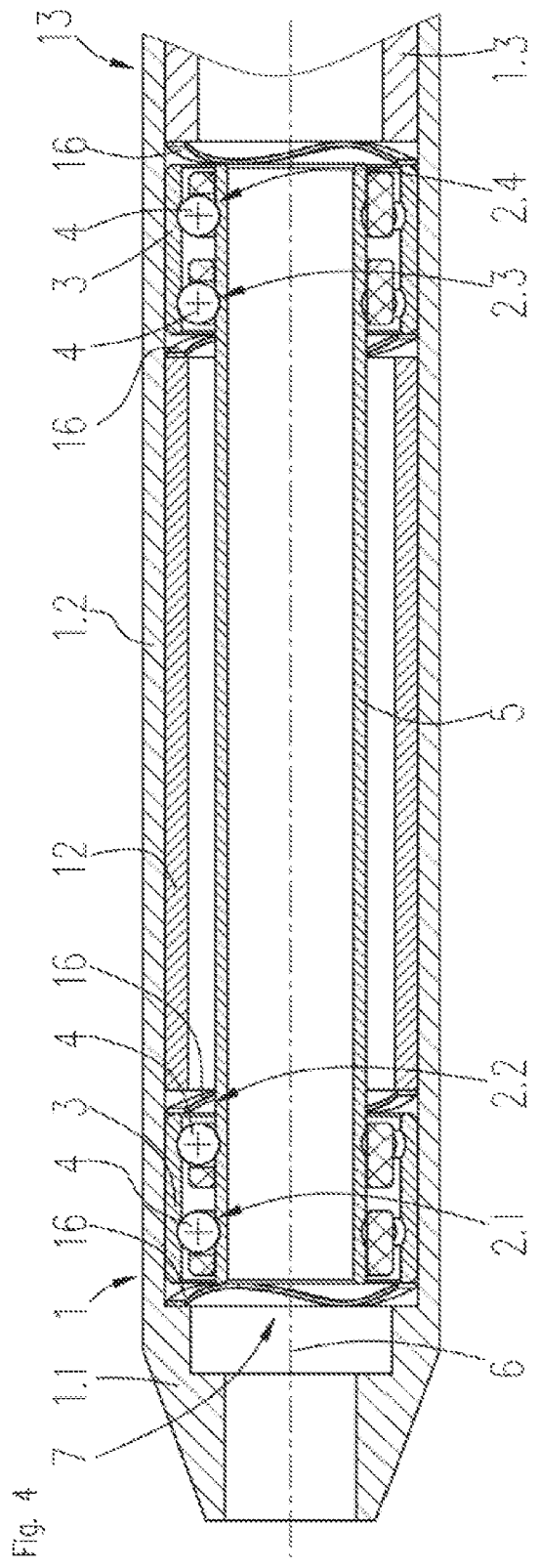

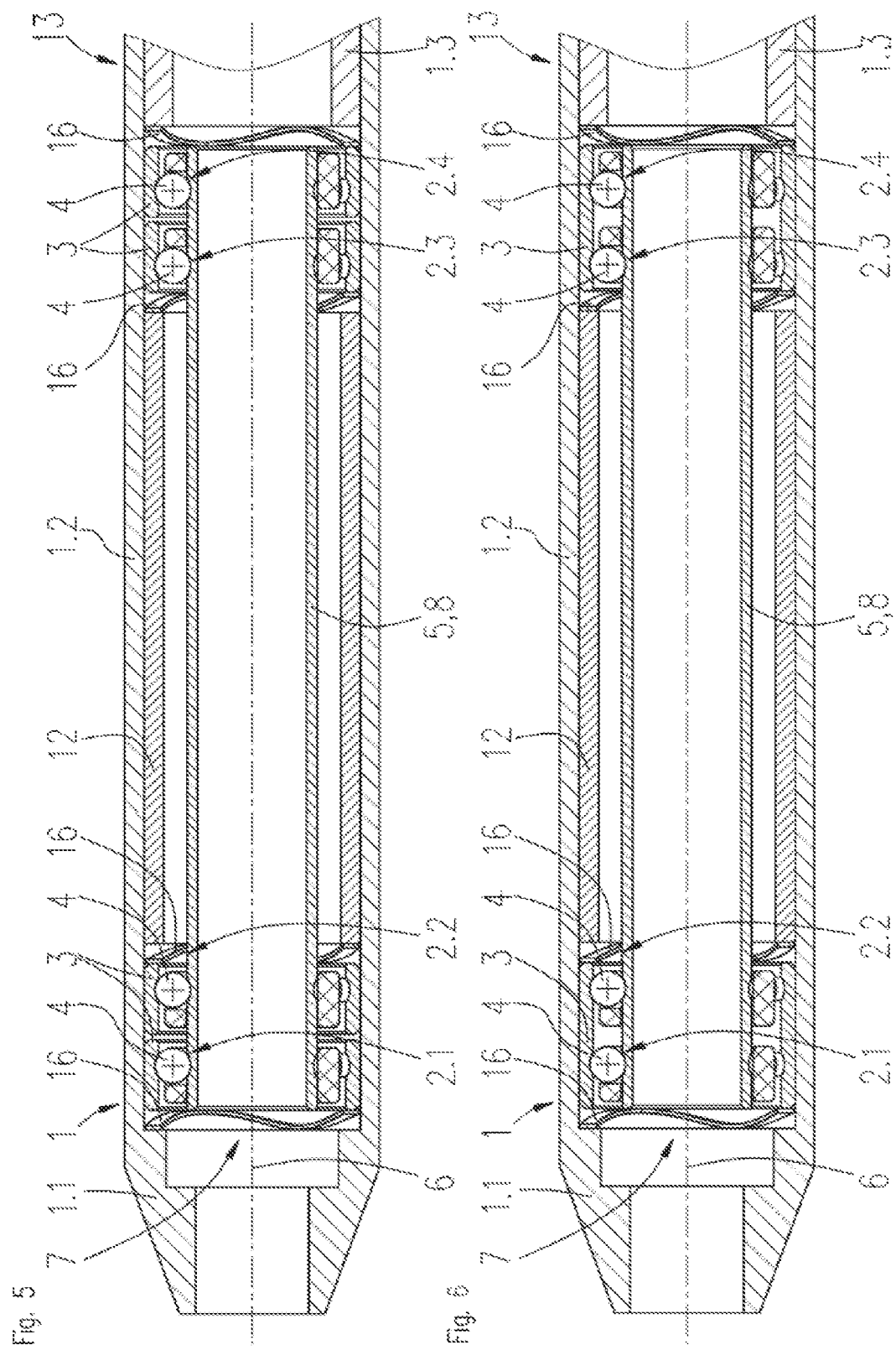

HEAD BEARING ASSEMBLY FOR A DENTAL OR SURGICAL HANDPIECE AND DENTAL OR SURGICAL HANDPIECE COMPRISING SUCH A HEAD BEARING ASSEMBLY

CROSS-REFERENCE TO RELATED APPLICATIONS

The present application claims priority to and the benefit of German Patent Application No. DE 102021204812.9, filed May 12, 2021, the entire disclosure of which is hereby expressly incorporated herein by reference.

BACKGROUND/SUMMARY

The present disclosure relates to a head bearing assembly for a dental or surgical handpiece, and to a dental or surgical handpiece having such a head bearing assembly.

A generic dental or surgical handpiece is disclosed in DE 60 2005 004 673 T2. Such a handpiece has a housing with a head bearing assembly in which the tool shaft of a dental or surgical handpiece is mounted. The tool shaft is driven by a drive device so that it rotates about an axis of rotation. The tool shaft is held interchangeably in the handpiece by a clamping device. Accordingly, the clamping device which clamps the tool shaft with jaws has a release device which is operable to at least loosen the clamping device so that the tool shaft can be pulled out of the clamping device. In particular, the present disclosure relates to handpieces having such a clamping device and release device.

Another surgical handpiece is disclosed in DE 20 2011 050 062 U1.

The head bearing assemblies in generic handpieces comprise at least four individual radial bearings, which as a rule exclusively support radial forces of the rotating tool shaft used. Each radial bearing has its own bearing outer ring, rolling elements in a rolling element row around the axis of rotation and its own bearing inner ring. Disadvantages of the arrangements are oscillations and vibrations occurring in the head bearing assembly during operation, which result in comparatively large heat generation and correspondingly large running noise. Due to the vibrations, the head bearing assembly is clearly limited in its maximum speed, because heat generation and running noise increase with increasing speed. As soon as a permissible temperature maximum is exceeded, the handpiece can no longer be used. Another disadvantage of the known head bearing assemblies in a dental or surgical handpiece is their limited service life.

The present disclosure is based on the object of specifying a head bearing assembly for a dental or surgical handpiece which avoids the aforementioned disadvantages, allows comparatively higher speeds, reduces heat generation during operation and generates comparatively lower running noise during operation. Furthermore, the service life is to be extended.

The object according to the disclosure is solved by a head bearing assembly having the features of claim 1. The dependent claims describe particularly advantageous and useful embodiments of the disclosure as well as a dental or surgical handpiece with such a head bearing assembly.

A head bearing assembly for a dental or surgical handpiece according to the disclosure has a single-part (that is integral) or multi-part outer sleeve in which at least four radial bearings are arranged, which enclose an axis of rotation and each have their own bearing outer ring or a common bearing outer ring. According to one embodiment, for example, two radial bearings can each have a common bearing outer ring. Other embodiments are possible.

In the circumferential direction around the axis of rotation, the bearing outer rings are enclosed radially on the outside by the outer sleeve. Thus, the bearing outer rings are arranged radially inside the outer sleeve. Advantageously, a radially inner surface of the outer sleeve and a radially outer surface of the bearing outer rings are directly opposite and/or abut each other.

Each radial bearing has at least one or exactly one rolling element row with rolling elements, in particular balls, which are arranged one behind the other in the circumferential direction and rolling in the respective bearing outer ring.

According to the disclosure, the at least four radial bearings have a common, integral (single-piece) bearing inner ring on which the rolling elements are arranged in rolling contact.

The solution according to the disclosure can be used to achieve a particularly low-vibration, quiet and low-friction head bearing assembly for a dental or surgical handpiece, which safely absorbs at least radial forces and allows for particularly high rotational speeds of the bearing inner ring and thus of a tool mounted in the bearing inner ring. For example, the head bearing assembly may have a maximum allowable speed of more than 50,000 revolutions per minute. In particular, the product of the pitch circle diameter in millimeters multiplied by the rotational speed is between 175,000 and 280,000. For example, the pitch circle may be 3.5 mm. The pitch circle describes a circle running through the center of the rolling elements, also called the ball center circle.

Particularly preferably, the head bearing assembly according to the disclosure forms a pre-assembled, inherently stable and functional unit. Thus, the head bearing assembly can be completely pre-assembled before it is inserted in this pre-assembled state into the housing of a dental or surgical handpiece. This significantly reduces the risk of incorrect assembly by a handpiece manufacturer. A pre-assembled, inherently stable unit is understood to mean a unit in which all components are held in their assigned operating position, so that the arrangement of the various components relative to one another already corresponds to the arrangement during operation of the head bearing assembly.

Preferably, the bearing outer rings are axially pretensioned against each other and/or against the outer sleeve in the direction of the axis of rotation. This avoids loose components within the head bearing assembly whose position is undetermined. The spring pretension minimizes operating noise, vibrations and the development of high temperatures.

Due to fact that, unlike the integral (or single-piece) bearing inner ring, several bearing outer rings are provided, in particular one bearing outer ring per rolling element row, this means that the bearing outer rings can move independently of one another in order to minimize friction occurring in the respective radial bearing. This reduces wear and the associated heat generation due to friction.

According to one embodiment of the disclosure, the bearing inner ring encloses a receiving space for a tool shaft of a dental or surgical tool. This makes it particularly easy to change the tool.

An alternative embodiment provides that the tool shaft is part of the head bearing assembly and one surface of the tool shaft forms the bearing inner ring. This allows particularly small radial dimensions of the head bearing assembly to be achieved.

It is particularly advantageous if the bearing outer rings are mounted in the outer sleeve so as to be axially displaceable in the direction of the axis of rotation, in particular displaceable against the spring pretension. This allows the bearing outer rings to be positioned independently of each other in their ideal position relative to the bearing inner ring during operation.

The radial bearings are designed in particular as deep groove ball bearings (or grooved ball bearings), i.e. with two rims per rolling element row on the bearing outer rings and two rims per rolling element row on the bearing inner ring. However, other designs are possible.

In particular, if the tool shaft forms the bearing inner ring, the tool shaft is hardened on its surface. However, a replaceable tool shaft can also be advantageously hardened on its surface in order to reduce wear during clamping and insertion in the head bearing assembly or the corresponding handpiece.

The rolling elements, in particular balls, are preferably made of ceramic or have a ceramic surface. This allows a reduction in friction and thus a reduction in heat to be achieved.

Particularly preferably, the outer sleeve has at least one axial stop which faces one of the bearing outer rings in the direction of the axis of rotation in such a way that the corresponding bearing outer ring abuts against the axial stop in the event of displacement, in particular against the spring pretension. In particular, this can prevent a spring element against which the bearing outer ring is displaced from compressing completely or to an undesired extent, thus avoiding the risk of plastic deformation of the spring element.

Particularly preferably, the outer sleeve has at least two axial stops facing each other, in particular axially outside the two axially outer bearing outer rings, to avoid this corresponding functionality of avoiding maximum deflection in both axial directions.

According to one embodiment of the disclosure, the spring pretension on the bearing outer rings can be achieved by one or more wave springs. According to one embodiment, one spring element, in particular one wave spring, is provided for each bearing outer ring. However, fewer or more spring elements can also be used.

A spacer can be arranged between at least two bearing outer rings positioned next to each other, in particular between two axially inner bearing outer rings, which are thus enclosed on their axial outer side by at least two further bearing outer rings, in order to bridge a comparatively large distance between the two axially inner bearing inner rings. Such a spacer can be spring-elastic and/or, particularly preferably, supported against the two axially inner bearing outer rings by a spring element, in particular one spring element in each case.

In particular, a spring element, in particular in the form of a corrugated spring, is provided in each case between the spacer and the respective adjacent bearing outer ring, and a spring element, in particular in the form of a corrugated spring, is provided in each case axially outside the two axially outer bearing outer rings, with which the two axially outer bearing outer rings are subjected to force in the direction towards each other. The two outer spring elements are supported, for example, on radial projections in the outer sleeve.

Particularly preferably, the outer sleeve is composed of a plurality of parts joined to one another by a material bond and/or by a frictional bond and/or by a form fit, wherein at least one or more of the following components is/are provided:
  a cover part at a first axial end of the outer sleeve;
  an integral (single-piece) or multi-piece center part that directly surrounds the bearing outer rings;
  a ring part at a second axial end of the outer sleeve, which is inserted in particular into an axial end of the center part.

In the above case, the radial projection for supporting the outer spring element is formed at the second axial end of the outer sleeve, in particular by the ring part, and at the first axial end of the outer sleeve by the cover part. The center part can then directly enclose at least four bearing outer rings and the spacer.

With four radial bearings, it is particularly preferred that the radial bearings are arranged in pairs in the area of the axial ends of the outer sleeve with an axial spacing of the pairs. The radial bearings can then form a so-called X alignment. This means that the lines of force through the respective radial bearing pair have the shape of an X in an axial section. Other alignments, for example an O alignment, are possible.

According to one embodiment of the disclosure, the bearing inner ring is of stepped design along a radially inner surface. This facilitates the mounting or insertion of the tool shaft, in particular if it is mounted with one or more damping rings in the bearing inner ring.

It is particularly favorable if the tool shaft is mounted in an interference fit in the bearing inner ring, although the interference fit still allows axial displacement. Such an interference fit can be achieved, for example, by arranging the damping rings mentioned, which are preferably elastically deformable, or by an elastic surface coating. However, a metallic pairing between the tool shaft and the bearing inner ring is also possible in order to achieve the desired tight fit that favors centering of the tool shaft.

A dental or surgical handpiece according to the disclosure has a housing and a head bearing assembly mounted in the housing, further a tool shaft supported in the outer sleeve of the head bearing assembly by the radial bearings.

For example, the tool shaft has at least one step on a radially outer surface facing the radially inner surface of the bearing inner ring. Such a stepped surface of the tool shaft may be stepped in a complementary manner to the stepped inner surface of the bearing inner ring so that the distance between the tool shaft and the bearing inner ring is at least substantially constant over the axial length of the bearing inner ring.

Between the radially outer surface of the tool shaft and the radially inner surface of the bearing inner ring, as shown, one or more damping rings, in particular in the form of an O-ring in each case, can be inserted, wherein at least one damping ring is arranged in particular in the region of each axial end of the bearing inner ring.

BRIEF DESCRIPTION OF THE DRAWINGS

The disclosure will be described below in an exemplary manner by way of exemplary embodiments and the figures, wherein:

FIG. 1 shows a schematic representation of a head bearing assembly according to the disclosure;

FIG. 2 shows an alternative embodiment of a head bearing assembly;

FIG. 3 shows an alternative embodiment of a head bearing assembly with a common bearing outer ring for each pair of bearings;

FIG. 4 shows the alternative embodiment of a head bearing assembly as shown in FIG. 3.

FIG. 5 shows an alternative embodiment of a head bearing assembly with a tool shaft that forms a bearing inner ring; and FIG. 6 shows the alternative embodiment of a head bearing assembly as shown in FIG. 5.

DETAILED DESCRIPTION

FIG. 1 shows an example of a head bearing assembly 13 of a dental or surgical handpiece in an axial section, wherein only one side of the head bearing assembly 13 is shown in relation to the axis of rotation 6. The head bearing assembly 13 is received in a housing 14 of the handpiece, wherein the housing 14 is also shown only very schematically. In addition to the head bearing assembly 13, a drive for the tool shaft 8 carrying a dental or surgical tool 9 is generally arranged in the housing 14, as well as a clamping device which absorbs axial forces of the tool shaft 8 in order to hold the tool 8 in the housing 14. The clamping device could also be part of the head bearing assembly 13, but is preferably provided separately therefrom.

The head bearing assembly 13 has an outer sleeve 1, which in the exemplary embodiment shown in FIG. 1 is in three parts, comprising a cover part 1.1, a hollow cylindrical center part 1.2 and a ring part 1.3 inserted at the second axial end of the center part 1.2. The cover part 1.1 and the ring part 1.3 form axial support surfaces for the axially outer spring elements 16, via which the axially outer bearing outer rings 3 of the axially outer radial bearings 2.1, 2.4 are resiliently supported on the outer sleeve 1.

In total, the head bearing assembly 13 has four radial bearings 2.1, 2.2, 2.3 and 2.4 positioned axially adjacent to one another, wherein two radial bearings 2.1, 2.2 and 2.3, 2.4 are arranged in each case in pairs at one axial end of the outer sleeve 1 and the central part 1.2 respectively. The bearing outer rings 3 of each pair of radial bearings 2.1, 2.2 and 2.3, 2.4 are preferably supported directly against each other in the axial direction. They could also each be of integral (single-piece) design. Between the bearing outer rings 3 of the two axially inner radial bearings 2.2, 2.3 there is preferably a spacer 12 which is supported axially on both sides against the two bearing outer rings 3 of the radial bearings 2.2, 2.3 by a spring element 16 in each case.

In the exemplary embodiment shown, all spring elements 16 are designed as wave springs. However, this is not mandatory.

To prevent an undesirably wide deflection of the axially outer spring elements 16, the outer sleeve 1 has axial stops 10, 11, each of which faces one of the two bearing outer rings 3 of the axially outer radial bearings 2.1, 2.4.

The bearing inner ring 5 of all radial bearings 2.1, 2.2, 2.3, 2.4 is designed as an integral (single-piece) sleeve in which the tool shaft 8 is accommodated. Accordingly, the bearing inner ring 5 encloses a receiving space 7 for the tool shaft 8.

In the exemplary embodiment shown, but not necessarily, damping rings 15 are provided between the tool shaft 8 and the bearing inner ring 5, preferably one damping ring 15 at each axial end of the bearing inner ring 5. Due to a stepped design of the radially inner surface of the bearing inner ring 5 and a diametrically oppositely stepped radially outer surface of the tool shaft 8, the insertion of the tool shaft 8 against the frictional force of the damping rings 15 is facilitated, since correspondingly the axial section with the comparatively smaller diameter of the tool shaft 8 does not have to slide along the damping ring 15 arranged on the correspondingly larger inner diameter of the bearing inner ring 5 when the tool shaft 8 is inserted.

The radial bearings 2.1, 2.2, 2.3, 2.4 are designed as deep groove ball bearings in the shown exemplary embodiment, but this is not mandatory. The rolling elements 4, which roll on the common bearing inner ring 5 and the separate bearing outer rings 3, are designed as balls.

As indicated by the force lines, each pair of immediately adjacent radial layers 2.1, 2.2 and 2.3, 2.4 forms an X alignment.

In the exemplary embodiment shown, the spacer 12 is also mounted in the outer sleeve 1 via damping rings 15. This reduces vibrations. However, this is also not mandatory.

In the three-part outer sleeve 1 according to FIG. 1, the cover part 1.1 is preferably inserted into the center part 1.2 with an interference fit and/or is connected to it by a material bond. The ring part 1.3 can also be inserted into the center part 1.2 with an interference fit and/or be connected to it by a material bond.

In the exemplary embodiment according to FIG. 2, the head bearing assembly 13 has a simplified design and requires a comparatively smaller radial installation space. For example, the cover part 1.1 is of integral (single-piece) design with the center part 1.2 and can be manufactured integrally therewith. The spacer 12 and the bearing outer rings 3 are inserted in direct contact in the outer sleeve 1 and the axial stops 10, 11 have been dispensed with.

Reference is made further to the description of FIG. 1.

LIST OF REFERENCE SIGNS

1 Outer sleeve
1.1 Cover part
1.2 Center part
1.3 Ring part
2.1 Radial bearing
2.2 Radial bearing
2.3 Radial bearing
2.4 Radial bearing
3 Bearing outer ring
4 Rolling element
5 Bearing inner ring
6 Axis of rotation
7 Receiving space
8 Tool shaft
9 Tool
10 Axial stop
11 Axial stop
12 Spacer
13 Head bearing assembly
14 Housing
15 Damping ring
16 Spring element

The invention claimed is:

1. Head bearing assembly for a dental or surgical handpiece, comprising an outer sleeve, in which at least four radial bearings are arranged, the at least four radial bearings enclose an axis of rotation and each of the at least four radial bearings has its own bearing outer ring or any two radial bearings of the at least four radial bearings share a common bearing outer rings, wherein the bearing outer rings are surrounded radially on the outside of the outer sleeve in the circumferential direction about the axis of rotation, each radial bearing has at least one or exactly one rolling element row with rolling elements which are arranged one behind the other in the circumferential direction and rolling in the respective bearing outer ring; and wherein each of the bearing outer rings are axially pretensioned against each other and each of the bearing outer rings are moveable independently from each other;

wherein the at least four radial bearings have a common, integral bearing inner ring on which the rolling elements are arranged in rolling contact.

2. Head bearing assembly according to claim 1, wherein the bearing outer rings are axially spring-loaded against the outer sleeve in the direction of the axis of rotation.

3. Head bearing assembly according to claim 2, wherein the bearing inner ring encloses a receiving space for a tool shaft of a dental or surgical tool.

4. Head bearing assembly according to claim 2, comprising a tool shaft for a dental or surgical tool, wherein a surface of the tool shaft forms the bearing inner ring.

5. Head bearing assembly according to claim 1, wherein the bearing inner ring encloses a receiving space for a tool shaft of a dental or surgical tool.

6. Head bearing assembly according to claim 1, comprising a tool shaft for a dental or surgical tool, wherein a surface of the tool shaft forms the bearing inner ring.

7. Head bearing assembly according to claim 1, wherein the bearing outer rings are mounted in the outer sleeve so as to be axially displaceable in the direction of the axis of rotation.

8. Head bearing assembly according to claim 7, wherein the outer sleeve has at least one axial stop which faces one of the bearing outer rings in the direction of the axis of rotation in such a way that the bearing outer ring abuts against the axial stop in the event of a displacement.

9. Head bearing assembly according to claim 8, wherein the outer sleeve has at least two axial stops facing each other.

10. Head bearing assembly according to claim 1, wherein between the at least two bearing outer rings positioned next to each other a spacer is arranged, against which the two bearing outer rings rest or against which the two bearing outer rings are spring-loaded.

11. Head bearing assembly according to claim 1, wherein the outer sleeve is composed of a plurality of parts connected to each other in a materially bonded and/or force-locking and/or form-fitting manner, comprising at least one or more of the following components:

a cover part at a first axial end of the outer sleeve;

an integral or multi-part center part which directly surrounds the bearing outer rings; and a ring part at a second axial end of the outer sleeve.

12. Head bearing assembly according to claim 1, wherein the radial bearings are arranged in pairs in the region of the axial ends of the outer sleeve with an axial spacing of the pairs of each pair forms an X alignment.

13. Head bearing assembly according to claim 1, wherein the bearing inner ring is of stepped design along a radially inner surface.

14. Dental or surgical handpiece having a housing, having a head bearing assembly mounted in the housing according to claim 1, and having a tool shaft supported in the outer sleeve by the radial bearings.

15. Dental medical or surgical handpiece according to claim 14, wherein the tool shaft is stepped at a radially outer surface facing the radially inner surface of the bearing inner ring.

16. Dental medical or surgical handpiece according to claim 14, wherein at least one or more damping ring(s) is/are introduced between the radially outer surface of the tool shaft and the radially inner surface of the bearing inner ring.

\* \* \* \* \*